US 8,610,966 B2

(12) United States Patent
Hatzav et al.

(10) Patent No.: US 8,610,966 B2
(45) Date of Patent: *Dec. 17, 2013

(54) SYSTEM FOR TEMPLATE BASED EXTRACTING INFORMATION FROM AN IDENTITY CARD

(76) Inventors: Iuval Hatzav, Culver City, CA (US); Ilan Ben-Shahar, Savion (IL); Giyora Sharaby, Moshav Neve Yarak (IL); Daniel Hatzav, Hod Hasharon (IL)

(*) Notice: Subject to any disclaimer, the term of this patent is extended or adjusted under 35 U.S.C. 154(b) by 267 days.

This patent is subject to a terminal disclaimer.

(21) Appl. No.: 13/020,058

(22) Filed: Feb. 3, 2011

(65) Prior Publication Data

US 2011/0128360 A1 Jun. 2, 2011

Related U.S. Application Data

(63) Continuation-in-part of application No. 10/959,261, filed on Oct. 6, 2004, now Pat. No. 7,911,655.

(51) Int. Cl.
*H04N 1/04* (2006.01)
(52) U.S. Cl.
USPC .......... 358/474; 358/475; 358/473; 382/181; 348/207.1
(58) Field of Classification Search
USPC .............. 358/474, 475, 473, 462, 483, 909.1, 358/509; 382/181; 348/61, E07.085, 156, 348/96, 207.1
See application file for complete search history.

(56) References Cited

U.S. PATENT DOCUMENTS

| | | | |
|---|---|---|---|
| 6,286,761 B1 * | 9/2001 | Wen | 235/468 |
| 6,876,032 B2 * | 4/2005 | Hsieh | 257/315 |
| 6,965,460 B1 * | 11/2005 | Gann et al. | 358/471 |
| 6,971,578 B2 * | 12/2005 | Tsikos | 235/462.14 |
| 7,388,691 B2 * | 6/2008 | Wang | 358/474 |
| 7,494,060 B2 * | 2/2009 | Zagami | 235/382 |
| 7,808,681 B2 * | 10/2010 | Hatzav et al. | 358/474 |
| 7,869,067 B2 * | 1/2011 | Blair et al. | 358/1.15 |
| 7,878,403 B2 * | 2/2011 | Hennick et al. | 235/462.11 |
| 8,023,136 B2 * | 9/2011 | Dugas | 358/1.15 |
| 8,157,175 B2 * | 4/2012 | Kotlarsky et al. | 235/462.24 |
| 8,240,339 B2 * | 8/2012 | Kamiyama et al. | 138/98 |
| 8,384,947 B2 * | 2/2013 | Edgar et al. | 358/1.6 |
| 2004/0201683 A1 * | 10/2004 | Murashita et al. | 348/207.1 |

* cited by examiner

*Primary Examiner* — Negussie Worku

(57) ABSTRACT

The present invention provides a unique and novel system for acquiring digital image frames of identification documents such as driver's license, passports, or medical insurance records using a digital camera so as to establish a high resolution image frame and extracting data automatically with machine vision tools so as to acquire accurate data. The present invention teaches also a system that acquires multispectral image frames of both sides of the identification document.

20 Claims, 10 Drawing Sheets

SYSTEM FOR TEMPLATE BASED EXTRACTING INFORMATION FROM AN IDENTITY CARD

CROSS REFERENCE TO RELATED APPLICATIONS

This application is a continuation-in-part of U.S. application Ser. No. 10/959,261, filed on Oct. 6, 2004, which is hereby incorporated by reference in its entirety.

FIELD OF THE INVENTION

The present invention relates to systems for extracting data. More particularly, the present invention relates to a system for acquiring digital image frames of identification documents such as driver's licenses, passports, and other similar identity cards and documents so as to extract data automatically with machine vision tools.

BACKGROUND OF THE INVENTION

A need exists in law enforcement and in many businesses to extract information from an identity document or identity card such as a credit card, driver's license or a passport. In some cases, it is convenient to automatically extract information from a non-official document such as business card or from a semi-official document such as library card, student card, store discount card, bank issued cards, checks etc.

Most of these identity documents contain information in text form. The information usually includes information on the type of the document and information specific to the document or the document holder such as: name, ID number, address, etc. Some of these identity documents may contain information encoded in non-textual form-such as barcode, two-dimensional barcode such as PDF417.

In many situations such as in an airport, hotel, car-rental or at a store, it is advantages to have a system that rapidly extracts the data with high throughput and long meant time between failure (MTBF). Similarly, in a bank, there is a need to extract information from checks. In many of these places extracting information is manually performed by a person reading the information from the document and entering it to the data system by typing it. Manual methods are time consuming and may cause errors.

Systems that are available today are based on scanning technology that is relatively poor in its resolution characteristics when it works with an OCR and the results are not satisfactory due to multiple errors.

The use of video cameras for capturing an image frame out of an identity card is shown in U.S. Pat. No. 5,642,160 titled "Digital image capture system for photo identification cards" that describes a digital image capture system for a photo identification card using a video camera. The system is adapted to compare the image frame of the card holder extracted from the card to an image frame of the person that hand the identity card. There is no reference as for extracting the data from the card.

There is a need to provide a system that is adapted to extract the data of the identity card in high resolution so as to prevent errors while omitting any information that exist on the card such as state symbols, marks etc.

SUMMARY OF THE INVENTION

Accordingly, it is a principle intention of the present invention to provide a system for acquiring digital image frames of identification documents such as driver's licenses, passports, medical insurance records, and other similar identity cards and documents so as to extract data automatically with machine vision tools.

In one embodiment the system comprises a box housing a digital camera equipped with a lens and at least one light source. Optionally, the light source is equipped with light diffuser to provide even illumination of the identity document. Optionally said diffuser is a light reflector. Optionally, light baffle prevents direct light reaching the identity document from the light source.

Optionally, front face of the box is made of transparent material and is optionally equipped with a frame to guide user in correct placing of the document against the front face. Alternatively, the front face has a slot with dimensions designed to accept an identity card. In this alternative, identity card is inserted into the slot to be acquired.

Acquiring data may be initiated by the user or may be initiated automatically when the system senses that a new document was placed. Sensing the placement of a new document may be done with a sensor within the system or by acquiring image frames at regular intervals and performing at least partial image analysis to identify placement of a document. Preferably, image frames acquired for this purpose are at lower image quality than image frames acquired for the purpose of information extraction.

Optionally, the system is equipped with a status display means, preferably an indicator light to inform the user when the system is ready for the next document etc.

The system is controlled by a processor. Optionally, the processor is connected to the box using a communication link such as USB2. Optionally, the processor is linked to external preferably official database for optional storing, verifying or distributing the extracted data. Preferably, the processor integrated into the system.

Extraction of textual data from the identity document is optionally assisted by prior knowledge of the type of document and a template stored in a database within the processor or at a remote location. The template includes known data fields, such as first name, last name, address fields. Optionally, the type of document is determined from the document, before fetching the template from the database.

Preferably, information extraction is done in stages: First, boundaries between text and background are determined based on minimum contrast between the character and other colored data on the card. Second, black and white glyphs are extracted using the data of boundaries. Third, OCR recognizes symbols and characters.

When using templates, after identifying the document and fetching the corresponding template, the image frame is overlaid by the fetched template, wherein each data field demarcates a respective data region of the overlaid image frame. If not all data fields are needed, data regions are selected. The textual information is extracted from such selected data regions. The black and white glyphs are extracted from within the approximate boundaries of the selected data regions.

In another embodiment of the correct invention, both sides of an identity card may be imaged simultaneously. In one embodiment, two digital cameras are positioned one in each side of the document. Alternatively, one camera is used while using mirrors to reflect images of both sides of the card towards the camera.

Several types of image frames may be acquired by the system:

Gray level or color (Red, Green Blue) image frame may be acquired by white light illumination and conventional color two-dimensional sensor array.

Infrared (IR) reflection image frame may be acquired by IR illumination and using the red sensitive part of the sensor array. Ultra violet (UV) reflectance image frame of the identity document may be acquired by illuminating the identity document with UV light and acquiring data from the blue sensitive pixels of a color sensitive sensor array.

Florescence image frame of the identity document may be acquired by illuminating the identity document with excitation light in UV or blue wavelength and acquiring data from the green and red sensitive pixels of a color sensitive sensor array.

In contrast to systems based on linear optical scanner, the current invention may acquire data more rapidly and optionally from both sides of the document. The inventive system may be designed with limited number or no moving parts and thus be more reliable than mechanically scamming systems.

Even illumination of the card, high resolution imaging, preprocessing of the image frame and prior knowledge of the template of the document, each contributes to higher accuracy of the extracted data.

Multi-spectral imaging enables locating authentication marks on the identity document, which are difficult to observe visually, or that are printed using invisible ink.

It is a principle intention of the present invention to provide a system for extracting information from an identity card that is accurate and less error-prone.

These and other objects and advantages in accordance with the present invention will become more readily apparent from a consideration of the ensuing description, claims, and accompanying drawings.

Further features and advantages of the invention will be apparent from the drawings and the description contained herein.

BRIEF DESCRIPTION OF THE DRAWINGS

An exemplary embodiment of the invention is described in the following section with respect to the drawings. The same reference numbers are used to designate the same or related features on different drawings. The drawings are generally not drawn to scale.

DETAILED DESCRIPTION OF THE INVENTION

The following detailed description is of the best presently contemplated modes of carrying out the present invention. This description is not to be taken in a limiting sense, but is made merely for the purpose of illustrating the general principles in accordance with the present invention. The scope of the present invention is best defined by the appended claims.

Figure 1A:
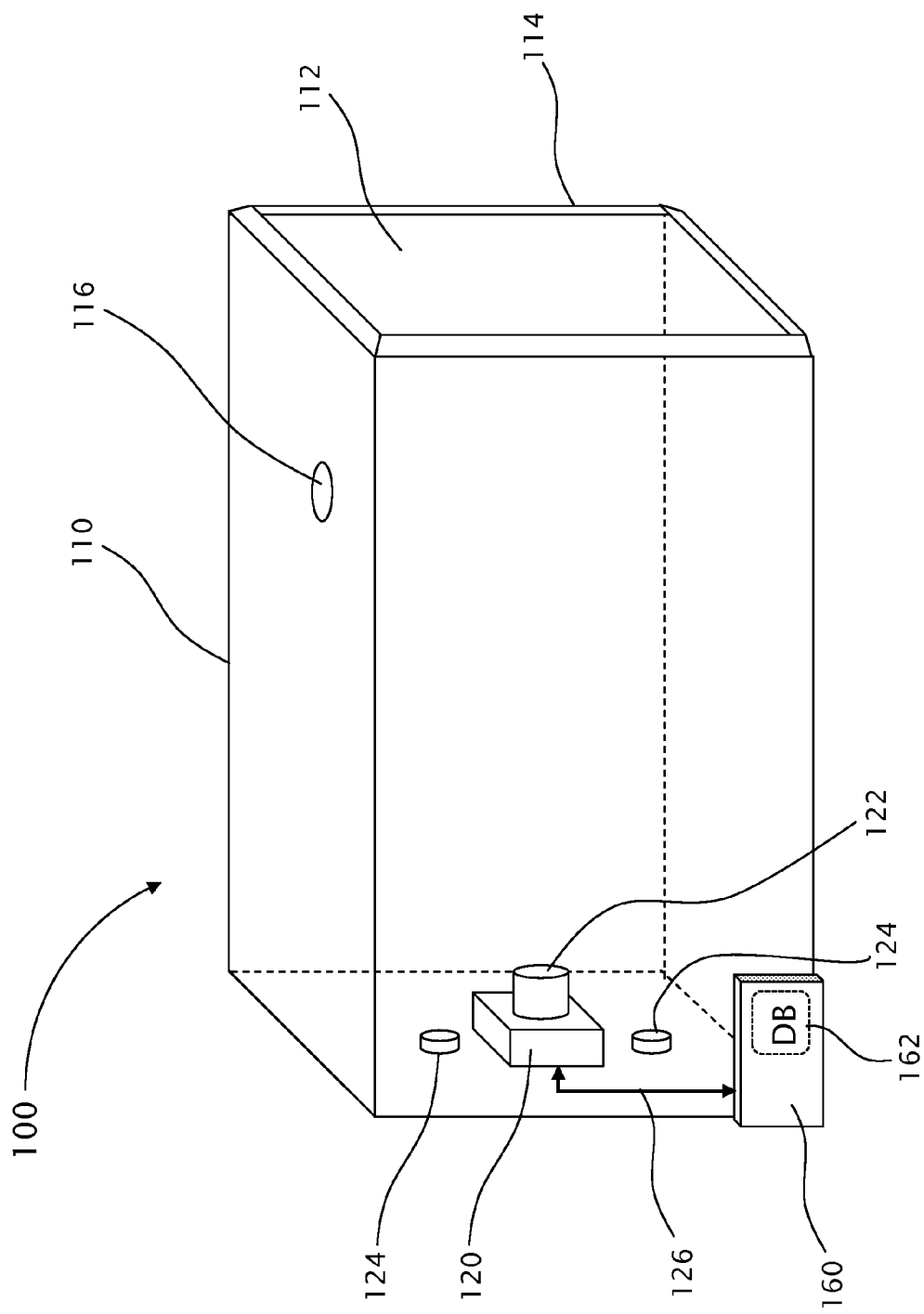
FIG. 1a is a system for extracting information from an identity card using a digital camera according to an exemplary embodiment of the invention.

With reference to the drawings, FIG. 1a illustrating a system for extracting information from an identity card using a digital camera according to an exemplary embodiment of the invention. System 100 for extracting information from an identity card uses a digital camera according to an exemplary embodiment of the invention.

A camera 120, typically a digital camera, equipped with a lens 122 is housed in a box 110 having a transparent front face 112. An identity card or an identity document such as a passport (not shown in FIG. 1a) is placed against the front face, and is illuminated by light sources 124. The system 100 is connected to a data-processing unit 160 such as an internal processor, a personal computer, a laptop computer, a PDA, or a palm computer using a communication link 126. Communication link 126 may use an internal bus, a standard serial or parallel protocol such as Universal Serial Bus (USB), RS232, General Purpose Interface Bus (GPIB), fiber optical communication link, RF communication such as Bluetooth. Preferably, USB2 communication link is used when using an external data processing unit.

Optional indicator light 116 indicates the status of the system such as ready, busy etc.

To extract information, the user places an identity card or identity document such as a passport against the transparent face 112 of box 110.

Optionally, a frame 114 is used to guide the user in placing the identity card at a predefined position in respect to the front face 112. Optionally, the frame 114 may be replaceable wherein each of the several replaceable frames is built to accommodate identity card of different dimensions. Alternatively, the frame is substantially as large as the field of view of the camera 120 and the identity card is placed flush against one of the corners of frame 114. Alternatively, an identity card smaller than front face 112 may be placed anywhere against the front face and image processing program executed in data processing unit 160 is used to determine the location of the identity card.

Figure 2:
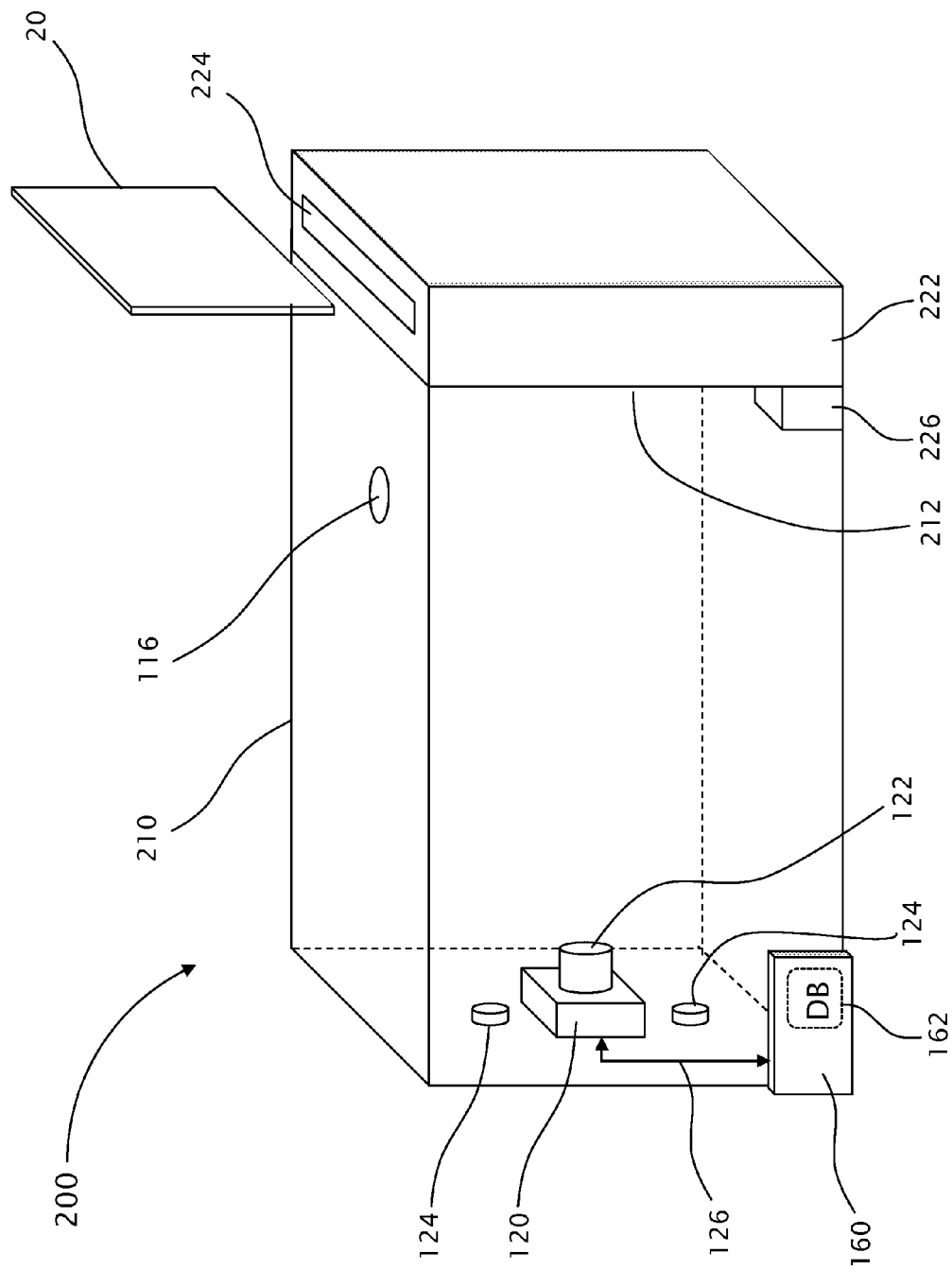
FIG. 2 is a system for extracting information from an identity card using a slotted card holder according to an exemplary embodiment of the invention.

In another embodiment of the invention depicted in FIG. 2, camera system 200 is housed in a box 210. In this embodiment, the frame is replaced with a slotted front face 222. The slotted front face has a slot 224. An identity card 20 may be inserted through the slot 224 such that its information carrying side faces the transparent front face 212. Alternatively, the slotted front face may have opening slightly smaller than the dimensions of the identity card instead of transparent front face 212.

Optionally, the system is equipped with card sensor 226. Card sensor 226 is capable of sensing if a card is placed and information can be acquired.

Card sensor 226 may be a micro-switch placed so the card activates it when the card is fully inserted. Alternatively, position of the identity card may be sensed by a photoelectric detector, pressure sensor or a proximity sensor.

Optionally, the system is equipped with Indicator light 116. For example, when the card sensor senses that a card was placed, the indicator light 116 changes its status to alert the user that data acquisition may start.

For example, indicator light may indicate one or more of the following system's states: Ready for card insertion, card is in position, data acquisition in progress, data processing in progress, remove card, system error. Optionally indicator light may be replaced with an LCD display, LED alphanumerical display or with audio indicator such as a buzzer or a speaker.

As a simple example, indicator light in the form of a single green LED may turn on only when acquisition ends and succeed. After the card is removed, the LED is turned off to indicate that the card should be removed and the system is ready for next card reading. Optionally, data acquisition may be activated by the card sensor.

Alternately, the user may manually activate data acquisition.

Preferably, the camera may acquire image frames at regular intervals, optionally using low image quality mode of operation. Image processing routine identifies the absence of a card or improperly inserted card and rejects the image frames. When the image processing routine identifies that a card is placed data acquisition is automatically activated. In this embodiment, indicator light will change appearance at the end of acquisition to signal the operator that he may remove the card. Acquiring an image frame may take a fraction of a second to two second depending on the camera and light source. When several types of data (for example visible and at least one of IR UV and FL) are acquired it is advantageous to keep the relative position between the several image frames by keeping the identity document stationary until data acquisition is completed. Optionally, the indicator light may also indicate the start of the data acquisition process signaling the user not to move the card until data acquisition is completed.

Returning to FIG. 1a At least one light source 124 is housed inside box 110. Light source 124 is design to illuminate the identity document to be acquired. Several light sources may be used. Substantially even illumination of the identity card may be achieved by use of several light source optionally equipped with proper light reflector or light diffuser.

In one embodiment of the invention, the light source produces substantially white light. In this embodiment, a color sensitive sensor array detects the light emitted from the source and reflected from the identity document.

In another embodiment, color imaging is achieved by sequentially illuminating the identity card with light of different colors.

Some identity documents contain information not visible to human eye. The information may be hidden using infrared (IR), ultra-violet (UV) or florescent (FL) ink.

In an exemplary embodiment of the invention light source 124 emits light in the visible and invisible wavelength bands. The light source may be a single source such as a flashlight, fluorescent light, incandescent light or white light LED or a combination of few sources with different wavelength spectra.

Preferably, light emitting diodes (LED) are used as light source for their low cost, small size, durability and low power consumption. Optionally a light source 124 is equipped with light diffuser to create uniform illumination of the identity document.

Camera 120 is equipped with an imaging lens 122 that focuses light from the identity document onto the 2-D sensor array. Lens 122 may comprise a combination of few lenses or a combination of refracting and reflecting optical elements. Reflecting elements may be used to reduce the overall size of the system by folding the optical path.

Digital camera 120 comprises a two-dimensional solid-state light sensor array. 2-D pixelated light sensors are commercially available. Common array are Silicon based. For example, an array of photodiodes may be used. Light impinging of an array is converted to electric charge. CCD or CMOS technology is used to readout the charge accumulated in each pixel to an analog to digital converter (ADC). The sensitivity spectra depend on the type of array used. For Silicon based arrays, the spectra spans from the near infrared (NIR) to the near ultraviolet (NUV). Some sensor array, such as used for TV cameras and digital still cameras are color sensitive. In these devices, Red Green and Blue (RGB) sensitive pixels are interspersed in the same array. Other color sensitive sensors uses optical filter to separate the light into wavelength bands and uses one sensor array for each color. Typically, the wavelength sensitivity of the red sensitive pixels extends into the NIR while the wavelength sensitivity of the blue sensitive pixels extends into the NUV.

Alternatively, a movable optical filter is placed in front of one 2-D array and wavelength bands are measured sequentially.

Color image frame of the identity document may be acquired by illuminating the identity document with white light and acquiring data by a color sensitive sensor array.

NIR reflectance image frame of the identity document may be acquired by illuminating the identity document with NIR light and acquiring data from the red sensitive pixels of a color sensitive sensor array.

NUV reflectance image frame of the identity document may be acquired by illuminating the identity document with NUV light and acquiring data from the blue sensitive pixels of a color sensitive sensor array.

Florescence image frame of the identity document may be acquired by illuminating the identity document with excitation light in UV, NUV or blue wavelength and acquiring data from the green and red sensitive pixels of a color sensitive sensor array. An optical filter designed to block the excitation wavelength may be used to protect the sensor.

The operation of the system for extracting information from an identity card using a digital camera is controlled by data processing unit 160.

Data processing unit 160 comprises at least digital processor and memory and optionally one or some of: mass data storage such as hard disk, removable storage, means for communication with remote location, input means such as keyboard, mouse or pad, and display unit.

Data processing unit may be commercially obtained, there are in use units such as PC computer, Palm computer, PDA unit or may be a proprietary processor.

In some embodiments of the invention, data processing unit is physically separated from box 110. In this embodiment, communication link 126 is used to exchange commands and data between data processing unit 160 and electronic equipment associated with box 110 such as camera 120, light source 124, indicating light 116 and card sensor 126.

In another embodiment of the invention, data processing is integrated into the box.

Due to physical limitations of the light source 124, lens 122 and camera 120 the image frame acquired by the system may have to be pre-processed in order to extract the information on the identity document. Optionally, the image frame is pre-processes by data processing unit 160 to correct some of these imperfections.

For example, color balance may be applied to correct color sensitivity of the sensor array or spectra of the light source or both.

For example, image distortion and deformation caused by aberration and imperfection in the lens may be corrected by distorting the image in the opposite way. A calibration image frame of a ruled card can be acquired in order to measure the distortion caused by the optical system.

Uneven illumination caused by imperfection in light spread from the light source may cause some parts of the image frame to be brighter or darker than the average brightness or to have different color balance. Similarly, deviation among pixels in the sensor array of sensitivity and dark signal may also cause variation in brightness. A calibration image frame of white or colored card may be used to measure the distortion caused by these effects. Optionally, few image frames acquired in different conditions are used to calculate a pixel sensitivity correction map to be applied to the image frame during pre-processing.

UV, IR or FL information is often printed on top of visible features on the identity document. In order to make this information easy to detect, proper subtraction of the information printed in visible ink may be applied.

Similarly, text printed on the identity card may be printed on top of background of varying shade or on top of feature printed in other color. Optionally, known background is subtracted from the image frame during pre-processing.

Generally, the properties of the identity document are known and data pre-processing may be optimized accordingly.

Figure 6:
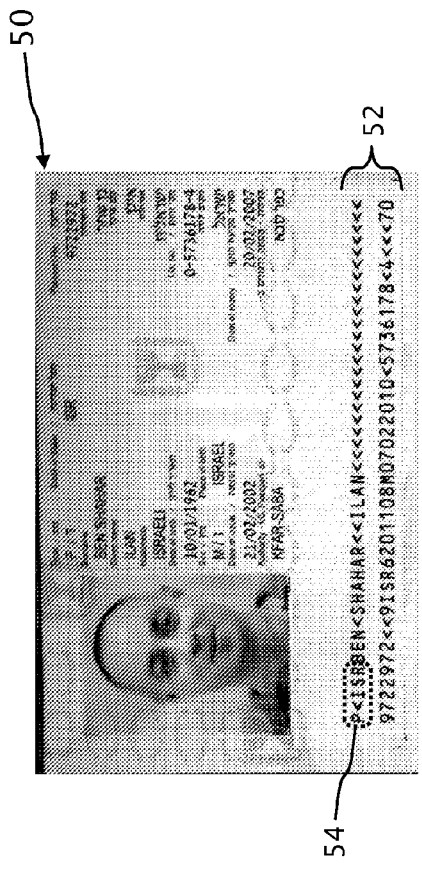
FIG. 6 depicts an exemplary image frame of an identity page from a passport.

Information in the identity card is extracted from the image frame. An optical character recognition (OCR) routine extracts alphanumerical information. By locating key features, the type of the identity document may be known or determined. For example, if the identity document is identified as a passport of a certain country, the location and meaning of textual information in the image frame may be predicted and used to assist the analysis. FIG. 6 depicts an example image frame 50 of an identity page from a passport. In the example depicted in FIG. 6, a key feature may be, by way of example, determining a string 54 of the first five characters of the two-line coded data 52. In passports, string 54 typically includes the character "P", followed by the character "<", followed by three letters which identify the country issuing the passport. In the example depicted in FIG. 6, the country is identified as Israel.

Figure 7:
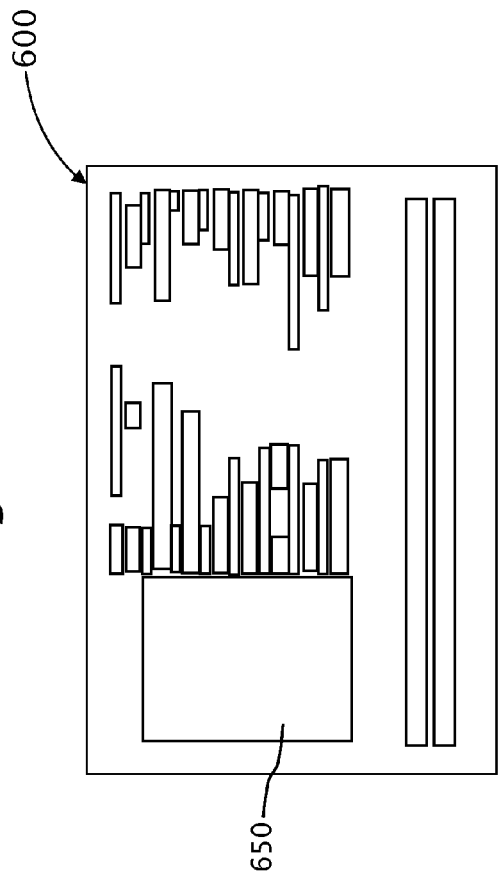
FIG. 7 is a preconfigured template designated for extracting data information from an identity page of a passport as shown in FIG. 6.

Reference is also made to FIG. 7, which is a preconfigured template 600 designated for extracting data information from an identity document type such as the identity page of a passport as depicted in image frame 50. Template 600 facilitates the processor of a system for extracting information from an identity card (100, 200 or, as shown in FIG. 3, system 300) to identify the information in a particular field and to predict the location of textual information in an image frame acquired from the identity document.

Figure 3:
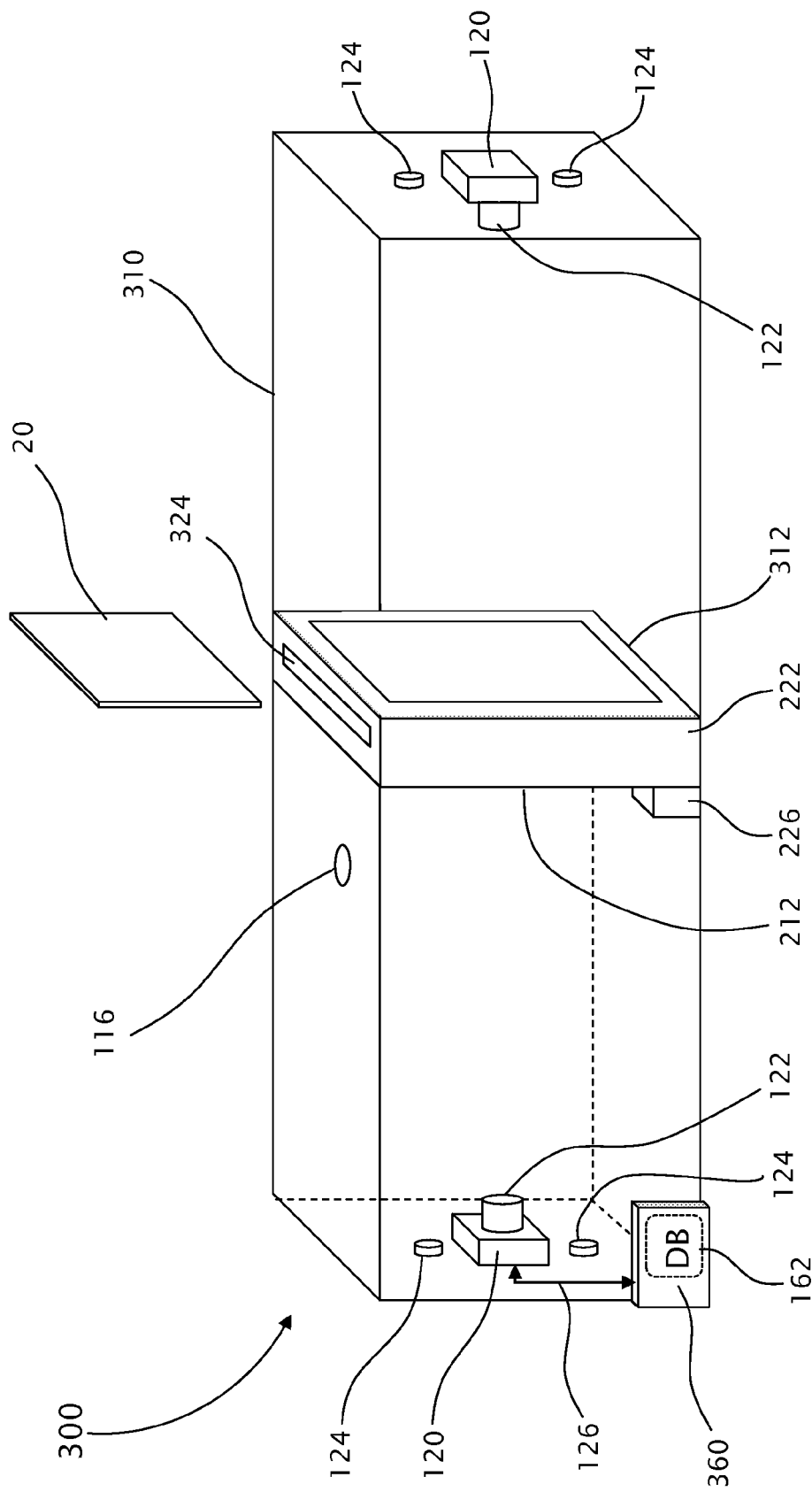
FIG. 3 is a system for extracting information from both sides of an identity card using two digital cameras according to an exemplary embodiment of the invention.
Figure 5:
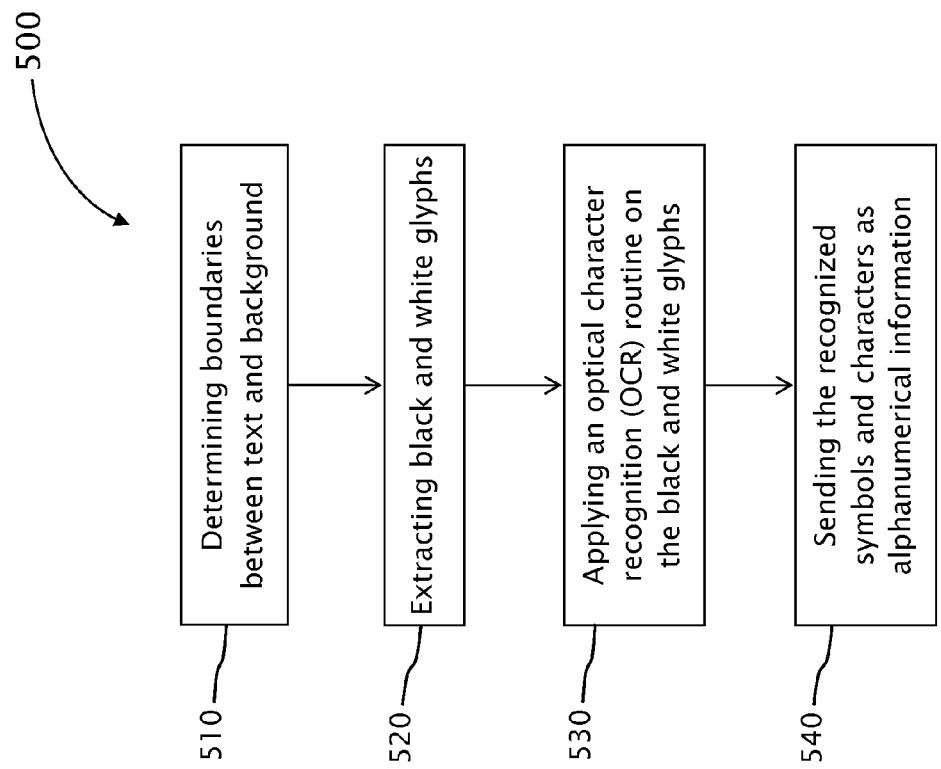
FIG. 5 is a data flowchart outlining an exemplary method for extracting information from an identity document using a system for extracting information from an identity card as shown in FIG. 1a, FIG. 2, FIG. 3 or in FIG. 4, according to embodiments of the present invention.

Reference is also made to FIG. 5, which is a data flowchart outlining an exemplary method 500 for extracting information from an identity document using a system for extracting information from an identity card as shown in FIG. 1a (system 100), FIG. 2 (system 200) or FIG. 3 (system 300), according to embodiments of the present invention. Preferably, information extraction is done in stages: First, boundaries between text and background are determined (step 510) based on the minimum contrast between the character and other colored data on the card. Second, black and white glyphs are extracted (step 520) using the data of boundaries. Third, OCR recognizes (step 530) symbols and characters.

Information extracted from the card may be sent (step 540) to remote location using communication link such as Internet, phone, fax or cellular networks.

Authentication of an identity card is optionally done by comparing features such as logo, color, fonts, and other characteristics of the documents to database stored in data processing unit or in a remote database. Alternatively or additionally, authentication of an identity card is done by comparing the extracted information to a database of records of valid or invalid documents.

Optionally, information extracted from identity document is used to save the user the task of manually inputting the information. For example, at a hotel check-in the necessary information could be extracted from a driver license and a credit card.

Optionally, information extracted from identity document is used for retrieving other information associated with the identity of the document holder. Optionally part of extracted information, for example name, family name or identity number is used as key words to perform a search for retrieving other information associated with the document holder such as credit history, etc. The search may be performed in databases stored locally in the processing unit, or in remote databases or both.

Optionally extracted information is used to augment database. For example, in a store or a hotel, a database of clients or visitors may be created and augmented so the owner of the system will be able to use it as a digital database for mailing advertisement or any other information.

Optionally several image frames of the same identity document may be imaged, analyzed and the extracted data be stored as one record. For example, two sides of the same identity card or several pages of a passport may be imaged sequentially.

Figure 1B:
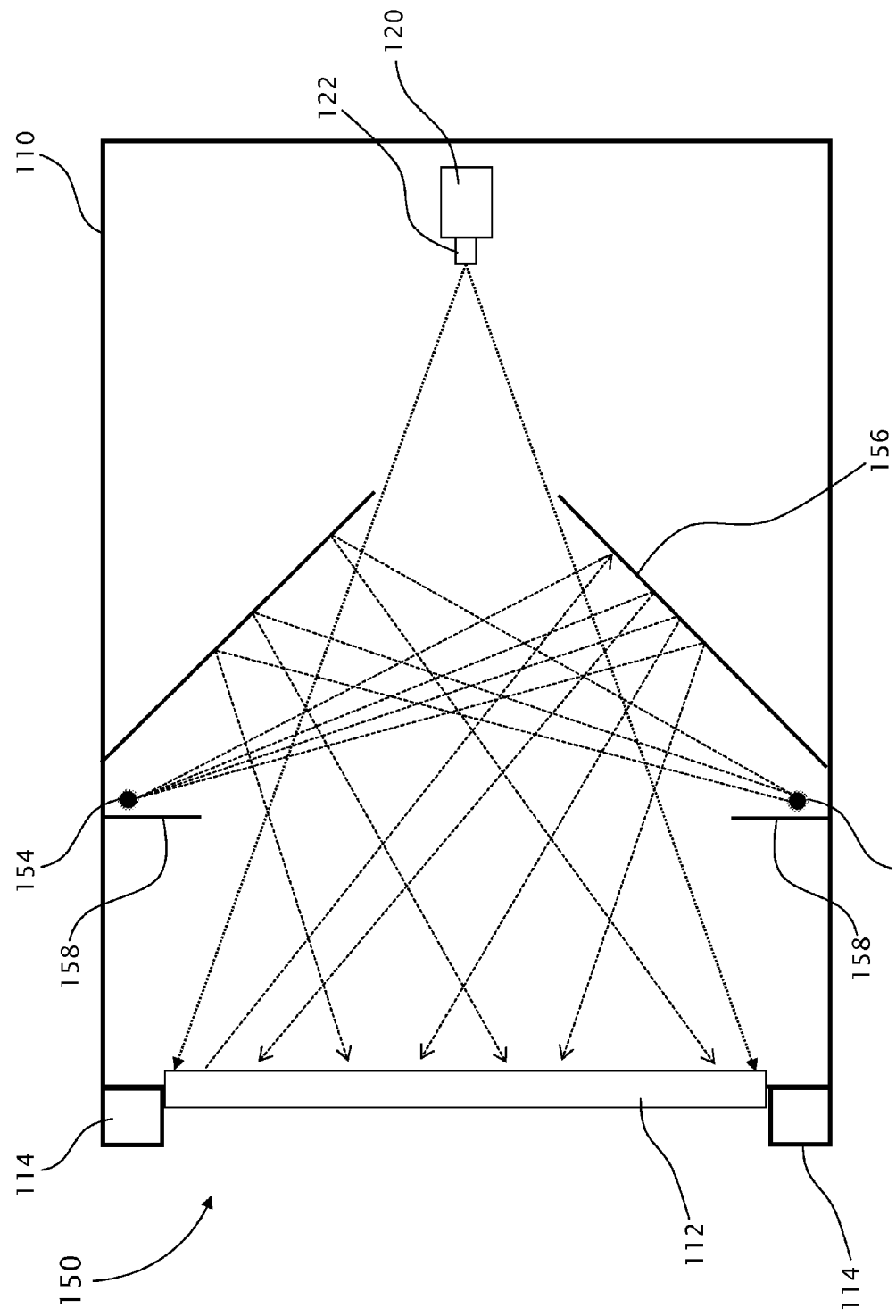
FIG. 1b is a system for extracting information from an identity card using a diffused light source according to another exemplary embodiment of the invention.

Reference is now made to FIG. 1b depicting a system 150 for extracting information from an identity card using a diffused light source according to another exemplary embodiment of the invention.

A digital camera 120 equipped with a lens 122 is housed in a box 110 having a transparent front face 112 and optional frame 114. An identity card or an identity document such as a passport (not shown in this figure) is placed against the front face and is illuminated by light sources 154.

In this exemplary embodiment of the invention, light from light source 154, shown as dashed arrows, is emitted from light source 154 and reflected by reflector 156 before arriving at the transparent front face 112. Reflector 156 may be curved and may be made of, or painted with light diffusing material in order to achieve even illumination of the identity document. Optionally, reflector 156 may be curved.

Direct optical path between light source and the identity document is optionally blocked by light baffle 158 to prevent unwanted bright spots in the image frame.

Light reflector 156 is built so it does not interfere with field of view (marked as doted arrows) of camera 120.

Several light sources, light reflectors and light baffles may be housed in the same box for more even illumination.

In many occasions, it is desired to image both sides of the card without having to place the card twice, each in every side. For that reason, simultaneous two-sided imaging using two cameras is employed.

Reference is now made to FIG. 3 depicting a system 300 for extracting information from both sides of an identity card 20 using two digital cameras according to an exemplary embodiment of the invention.

Two digital cameras 120 each equipped with a lens 122 are housed in a box 310 having a slotted card holder 322. An identity card 20 is inserted into slot 324 so each of its sides is against one of a transparent wall 312. Optionally, the system is equipped with card sensor 226. The sensor is capable of sensing if a card is placed and information can be acquired. Optionally, the system is equipped with Indicator light 116. When the card sensor senses that a card was placed, the indicator light 116 changes its status to alert the user that data acquisition may start. The system is connected to a data processing unit 360 via communication link 126. At least two light sources 124 are placed so both sides of the identity card can be illuminated. In this embodiment, both sides of an identity card may be imaged and analyzed at once.

Optionally, light sources in this embodiment are in the configuration of FIG. 1a.

Alternatively, the slotted card holder 322 may have opening slightly smaller than the dimensions of the identity card instead of transparent front face 312.

Optionally, one camera can be employed in a simultaneous two-sided imaging using one camera.

Figure 4:
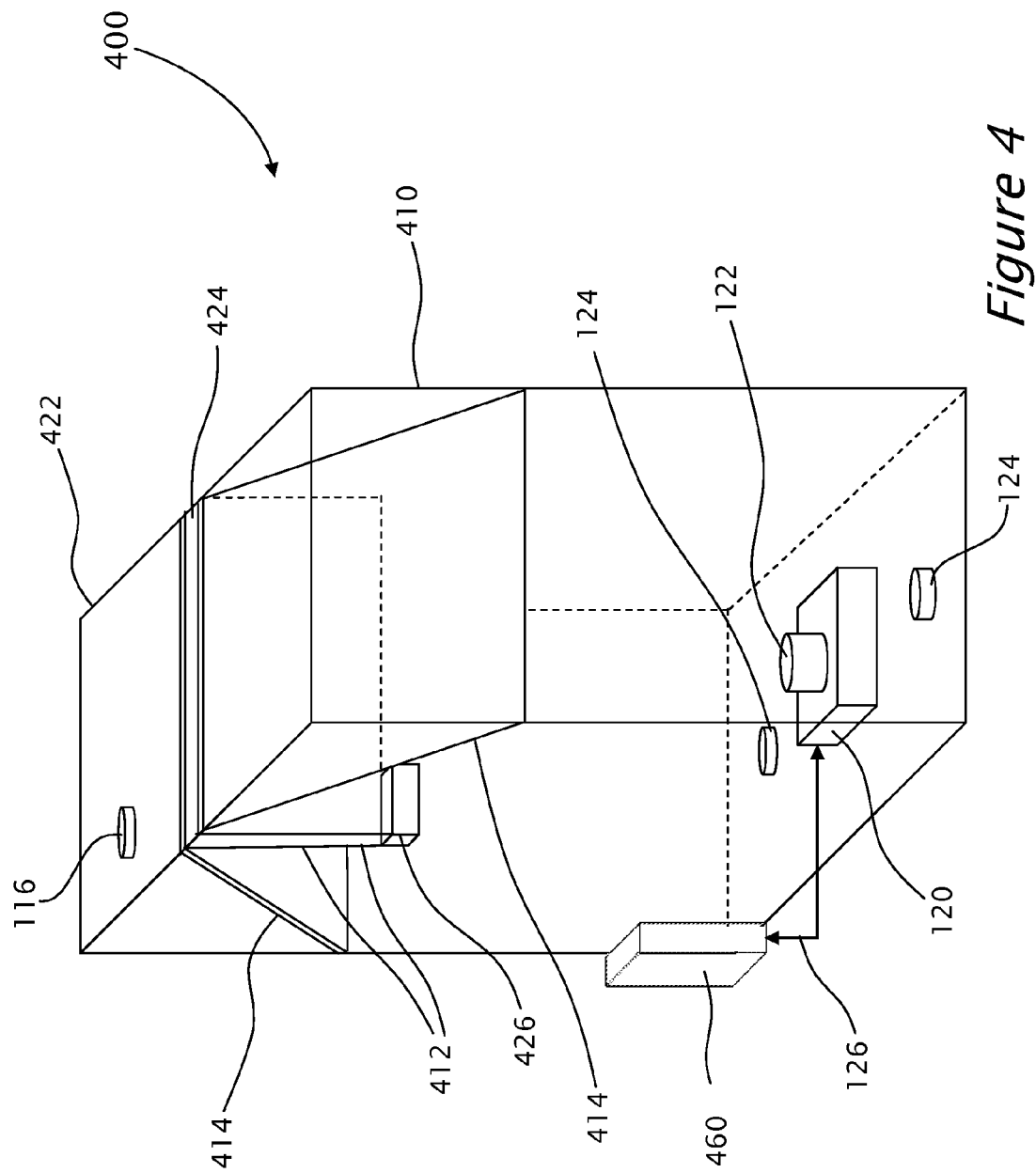
FIG. 4 is a system for extracting information from both sides of an identity card using one digital camera according to an exemplary embodiment of the invention.

Reference is now made to FIG. 4 depicting an embodiment of a system 400 for extracting information from both sides of an identity card using one digital camera. A digital camera 120 equipped with a lens 122 is housed in a box 410 having a slotted face 422. An identity card is inserted into slot 424 so each of its sides is against one of a transparent wall 412. Optionally, the system is equipped with card sensor 426. The sensor is capable of sensing if a card is placed and information can be acquired. Optionally, the system is equipped with Indicator light 116. When the card sensor senses that a card was placed, the indicator light 116 changes its status to alert the user that data acquisition may start. The system is connected to a data processing unit 460 via communication link 126.

Two mirrors 414 are positioned so that reflections of both sides of the identity card are reflected towards camera 120.

At least one light source 124 is placed within the box 410 so both sides of the identity card may be illuminated.

Figure 8:
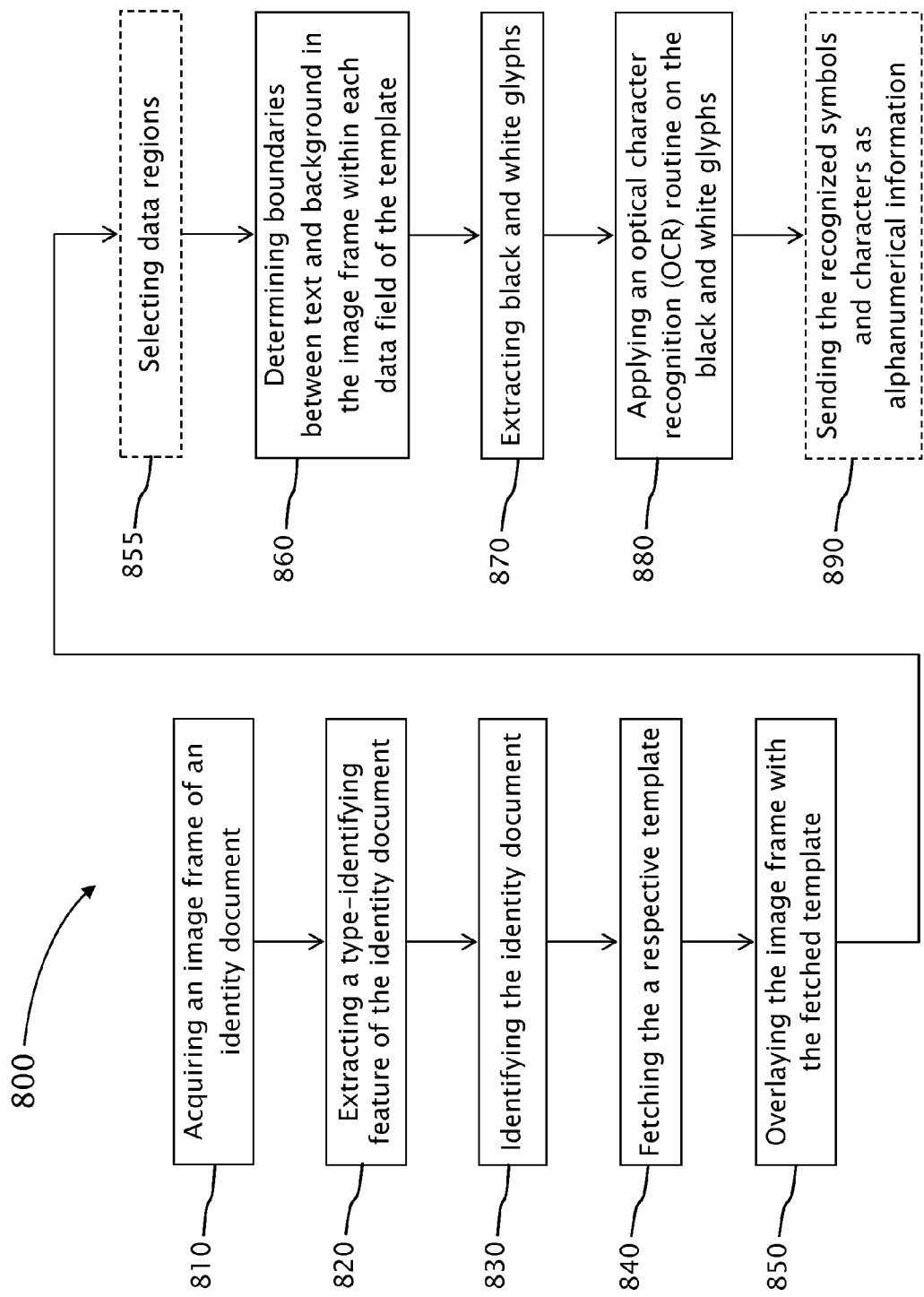
FIG. 8 is a data flowchart outlining another exemplary method for extracting information from an identity document using a system for extracting information from an identity card as shown in FIG. 1a, FIG. 2, FIG. 3 or FIG. 4, according to embodiments of the present invention.

Reference is now also made to FIG. 8, which is a data flowchart outlining an exemplary method 800 for scanning and extracting information from an identity document using a system for extracting information from an identity card as shown in FIG. 1a (system 100), FIG. 2 (system 200), FIG. 3 (system 200), or FIG. 4 (system 400), according to embodiments of the present invention. Preferably, method 800 for document scanning, identifying and information extraction is done in stages, as follows:

Step 810: acquiring one or more image frames of an identity document 20.

An identity document 20 is disposed in position, and imaged by digital camera 120.

Step 820: extracting a type-identifying feature of the identity document.

The one or more acquired image frames are scanned and one or more document identifying features are detected and extracted.

Step 830: identifying identity document 20.

Identity document 20 is identified based on the extracted one or more document identifying features.

Step 840: fetching a respective template.

Based on identification of identity document 20, a respective template, such as template 600, is extracted from a template database 162.

Step 850: overlaying the fetched template over the image frame.

The fetched template is overlaid over the image frame. The template includes known data fields disposed at a preconfigured location, wherein each data field demarcates a respective data region of the overlaid image frame.

Step 855: selecting data regions.

Selecting all or predetermined data regions, the textual information is extracted from such selected data regions, whereas the OCR routines are applied only approximately within the boundaries of the selected data regions. It should be noted that the demarcated data regions are considered as suggested regions only, as images may vary in many ways, for example, due to scaling, rotational and other variations, while the templates kept in template database 162 have fixed dimensions.

Step 860: determining boundaries between text and background in the image frame, approximately within each data field of the template.

Boundaries between text and background are determined, approximately within image-frame regions corresponding to each data field of the template, based on the minimum contrast between the character and other colored data on the card.

Step 870: extracting black and white glyphs.

Black and white glyphs are extracted using the data of the determined boundaries.

Step 880: OCR recognizes symbols and characters.

Processing unit applies OCR onto the extracted black and white glyphs, to recognize symbols and characters.

Step 890: preferably, sending the recognized symbols and characters as alphanumerical information.

Figure 9:
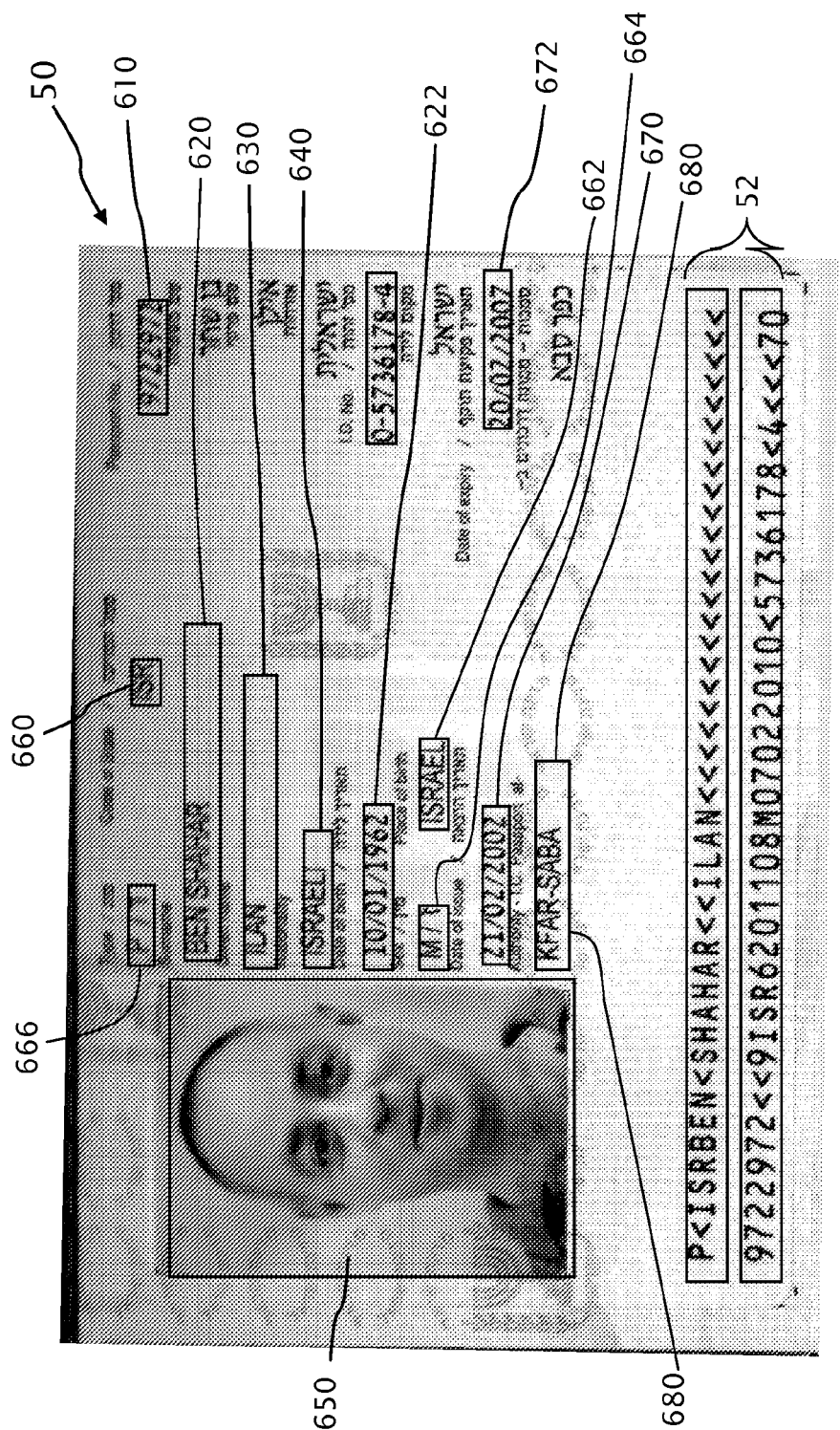
FIG. 9 illustrates the template shown in FIG. 7 overlaid over the scanned image frame shown in FIG. 6.
Figure 10:
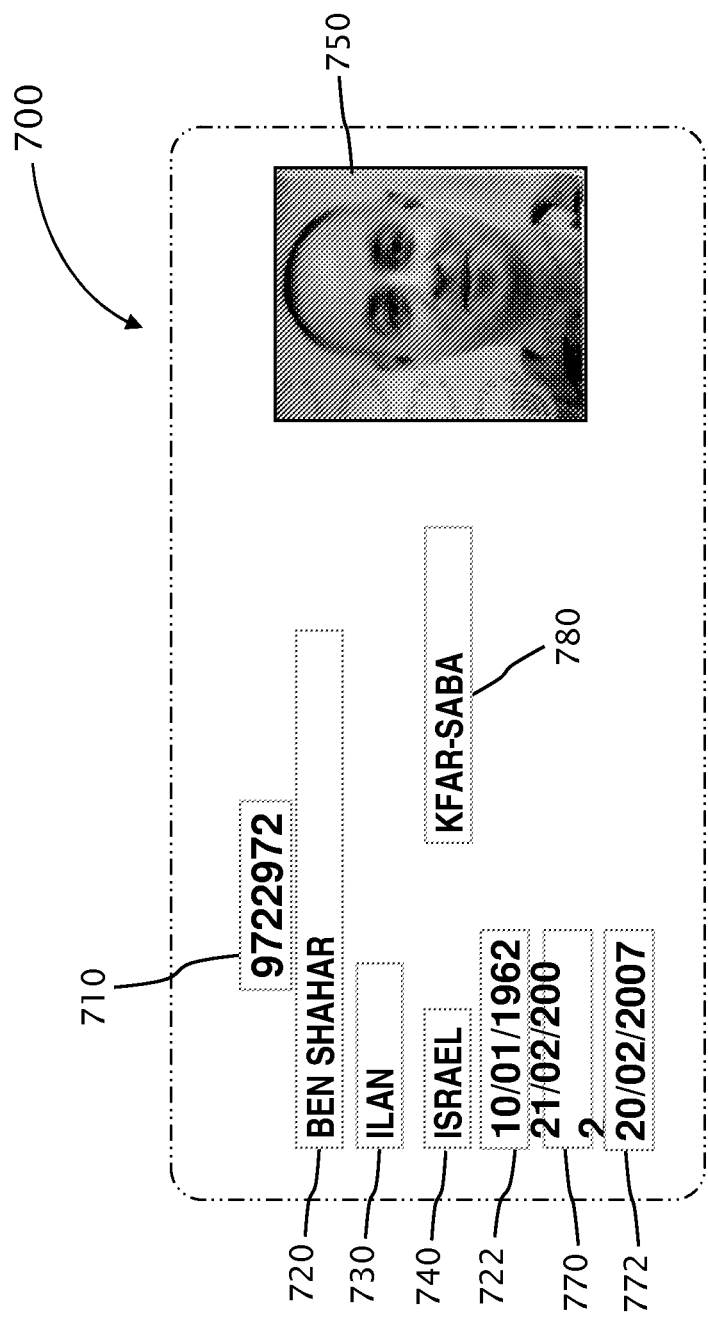
FIG. 10 illustrates an exemplary output layout of data fields extracted from the scanned image frame shown in FIG. 6.

Preferably, the recognized symbols and characters are sent to a target receiving unit as alphanumerical information. Information extracted from the card may be sent to a remote location using communication links such as Internet, phone, fax or cellular networks. Reference is also made to FIG. 9, which illustrates exemplary template 600, as shown in FIG. 7, overlaid over the identified image frame 50, shown in FIG. 6; and to FIG. 10, which illustrates an exemplary output layout 700 of data fields extracted from the scanned image frame shown in FIG. 6. In the example shown in FIGS. 6, 9 and 10, data field 54 identifies that the document is a passport issued by "Israel". Data field 610 identifies the passport number as "9722972", which data is shown as outputted in alphanumeric string 710 of layout 700. Data field 620 identifies the owner's last name as "BEN SHAHAR", which data is shown as outputted in alphanumeric string 720 of layout 700. Data field 630 identifies the owner's first name as "ILAN", which data is shown as outputted in alphanumeric string 730 of layout 700. Data field 640 identifies the owner's citizenship being "Israeli", which data is shown as outputted in alphanumeric string 740 of layout 700. Data field 650 identifies the owner's picture, which data is shown as outputted in alphanumeric string 750 of layout 700. Data field 622 identifies the owner's birth date as "10 Jan. 1962", which data is shown as outputted in alphanumeric string 722 of layout 700. Data field 670 identifies the issue date as "21 Feb. 2002", which data is shown as outputted in alphanumeric string 770 of layout 700. Data field 680 identifies the passport issuing office as "KFAR-SABA", which data is shown as outputted in alphanumeric string 780 of layout 700. Data field 672 identifies the expiration date as "20 Feb. 2007", which data is shown as outputted in alphanumeric string 772 of layout 700. It was predetermined that other data fields, such as 660, 662, 664 and 666 will not show in output layout 700.

While the invention has been described with reference to certain exemplary embodiments, various modifications will be readily apparent to and may be readily accomplished by persons skilled in the art without departing from the spirit and scope of the above teachings.

It is noted that some of the above described embodiments may describe the best mode contemplated by the inventors and therefore include structure, acts or details of structures and acts that may not be essential to the invention and which are described as examples. Structure and acts described herein are replaceable by equivalents that perform the same function, even if the structure or acts are different, as known in the art. Therefore, the scope of the invention is limited only by the elements and limitations as used in the claims. The terms "comprise", "include" and their conjugates as used herein mean "include but are not necessarily limited to".

What is claimed is:

1. A system for automatically extracting information from an identity document, the system comprising:
   a) at least one light source for illuminating the identity document;
   b) at least one digital camera including a lens and a two-dimensional sensor array configured to acquire at least one two-dimensional image frame of the identity document; and
   c) a processor for processing said at least one two-dimensional image frame, said processor being in communication flow with a document-template database, said processor is configured to apply an optical character recognition (OCR) routine for extracting textual information from said at least one two-dimensional image frame of the identity document in the form of alphanumerical information, wherein said OCR routine includes:
      i) determining a type of the identity document;
      ii) fetching a matching template from said document-template database, wherein said matching template corresponds to said determined type of the identity document, and wherein said template includes one or more data fields;
      iii) overlaying said at least one two-dimensional image frame with said matching template, wherein each data field demarcates a respective data region of said overlaid image frame, to thereby obtain a geometrical correlation between said at least one two-dimensional image frame and said template;
      iv) selecting data regions, wherein said textual information is extracted from selected data regions;
      v) determining boundaries between text and background based on a minimum contrast between a character and other colored data on said image frame of the identity document, approximately within the boundaries of said selected data regions;
      vi) extracting black and white glyphs using at least a portion of said determined boundaries; and
      vii) applying said OCR routine on said black and white glyphs, thereby recognizing symbols and characters.

2. A system according to claim 1, wherein said OCR routine further includes:
   viii) sending said recognized symbols and characters as alphanumerical information.

3. A system according to claim 1, the system further comprising:
   d) a box for housing said digital camera and said light source; and a communication link for connecting said box to said processor.

4. A system according to claim 1, the system further comprising:
   d) mirrors for simultaneously imaging both sides of said document.

5. A system according to claim 1, wherein said at least one light source includes at least two light sources for respectively illuminating both sides of said document; and wherein said at least one digital camera includes two digital cameras for respectively imaging both sides of the identity document.

6. A system according to claim 1, wherein said light source includes a light diffuser for even illumination of the identity document.

7. A system according to claim 6, wherein said light diffuser is a light reflector.

8. A system according to claim 7, the system further comprising:
   d) a light baffle for preventing directly illuminating the identity document by said light source.

9. A system according to claim 1, wherein extraction by said OCR routine is facilitated by prior knowledge of said type of the identity document.

10. A system according to claim 1, wherein acquisition of said at least one two-dimensional image frame is automatically initiated by sensing proper placement of the identity document.

11. A system according to claim 10, the system further comprising:
    d) a card sensor for facilitating said sensing proper placement of the identity document.

12. A system according to claim 10, wherein said sensing proper placement of the identity document is performed by acquiring image frames and performing at least partial image processing of said image frames.

13. A system according to claim 12, wherein said image frames used for sensing proper placement of the identity document are of lower quality than image frames used for extracting information.

14. A system according to claim 1, wherein said alphanumerical information is used to save a user from manually inputting said alphanumerical information.

15. A system according to claim 1, wherein said textual information is used to augment a database.

16. A system according to claim 1, wherein said textual information is used as key words to perform a search.

17. A system according to claim 1, wherein said processor is configured to perform pre-processing steps, for facilitating better-quality image frames of the identity document, before applying said OCR routine for extracting textual information from the identity document in the form of alphanumerical information.

18. A method for extracting information from an identity document, the method comprising the steps of:
    a) providing a system for extracting information from an identity document including:
       i) at least one light source for illuminating the identity document;
       ii) at least one digital camera having a lens and a two-dimensional sensor array for acquiring at least one two-dimensional image frame of the identity document; and
       iii) a processor, being in communication flow with a document-template database, for processing said at least one two-dimensional image frame,
    b) determining a type of the identity document;

c) fetching a matching template from said document-template database, wherein said matching template corresponds to said determined type of the identity document, and wherein said template includes one or more data fields;

d) overlaying said at least one two-dimensional image frame with said matching template, wherein each data field demarcates a respective data region of said overlaid image frame, to thereby obtain a geometrical correlation between said at least one two-dimensional image frame and said template;

e) selecting data regions, wherein the information is extracted from selected data regions;

f) determining boundaries between text and background based on a minimum contrast between a character and other colored data on said image frame of the identity document, approximately within the boundaries of said selected data regions;

g) extracting black and white glyphs using at least a portion of said determined boundaries;

h) applying an optical character recognition (OCR) routine on said black and white glyphs, thereby recognizing symbols and characters; and i) sending said recognized symbols and characters as alphanumerical information, wherein said determining of said type of the identity document and said determining boundaries in the identity document are performed before applying said OCR routine on said black and white glyphs.

19. A method according to claim 18, the method further comprising:

j) pre-processing said at least one two-dimensional image frame, for facilitating better-quality image frames of the identity document, wherein said pre-processing is performed before applying said OCR routine on said black and white glyphs.

20. A method according to claim 19, wherein said pre-processing includes at least one of the following steps selected from the group consisting of:

i. determining said type of the identity document and removing an image-frame background from the identity document;

ii. calibrating illumination parameters before acquiring an image frame of the identity document for extracting the information from the identity document; and iii. correcting image distortions caused by known lens distortions.

* * * * *